Figure 1:
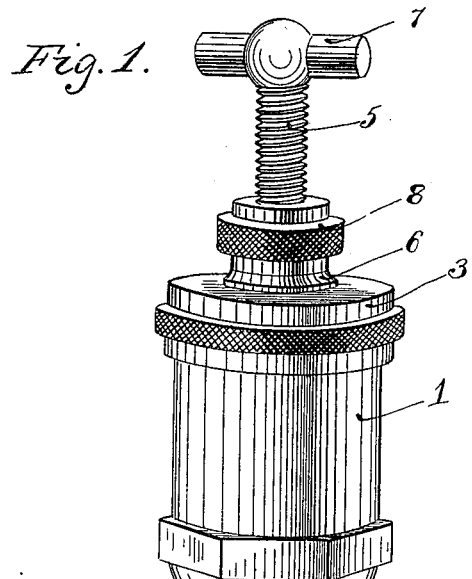

No. 666,318. Patented Jan. 22, 1901.
G. KIRKLAND.
CONVERTIBLE GREASE CUP.
(Application filed June 23, 1900.)
(No Model.)

Witnesses
Robert Otto.
Harry Kilgore.

Inventor
George Kirkland.
By his Attorneys.
Williamson & Merchant

UNITED STATES PATENT OFFICE.

GEORGE KIRKLAND, OF HAMILTON, CANADA.

CONVERTIBLE GREASE-CUP.

SPECIFICATION forming part of Letters Patent No. 666,318, dated January 22, 1901.

Application filed June 23, 1900. Serial No. 21,267. (No model.)

*To all whom it may concern:*

Be it known that I, GEORGE KIRKLAND, a subject of the Queen of Great Britain, residing at Hamilton, in the county of Wentworth and Province of Ontario, Canada, have invented certain new and useful Improvements in Convertible Grease-Cups; and I do hereby declare the following to be a full, clear, and exact description of the invention, such as will enable others skilled in the art to which it appertains to make and use the same.

My invention has for its object to provide an improved grease lubricator-cup; and to this end it consists of the novel devices and combinations of devices hereinafter described, and defined in the claims.

So-called "grease-cups" hitherto employed for lubricating purposes belong to one or the other of two classes, generally known the one as "positive force-feed grease-cups" and the other as "continuous automatic spring-feed cups." A cup of the first-noted class is usually one which is fitted with a piston having a screw-threaded stem that works with a positive action through the top or head of the cup, so that by turning the said piston-stem at such times as thought necessary the piston may be moved against the grease with such force as is necessary to positively force the grease to the bearing. On the other hand, a cup of the second-noted class is usually one fitted with a piston having a stem that is free to move longitudinally through the top of the cup, such piston being subject to a spring that yieldingly and constantly forces the same against the grease, thereby continuously and automatically forcing or feeding the grease to the bearing. Hence as hitherto constructed grease-cups could only be used for the particular one class or kind of work. Each class or type of grease-cup has its inherent advantages over the other. For instance, the so-called "automatic" or "continuous" spring grease-cup does not require the personal attention which is necessary with the so-called "positive force-feed grease-cup," and, furthermore, may be practically applied to running or reciprocating parts, to which it would be impracticable to apply the positive force-feed cup. On the other hand, it is often found necessary before starting up a machine to positively force by compression the grease into the bearing, and this may be readily accomplished by a hand action with the positive force-feed cup, while it could not be accomplished with the so-called "automatic spring-feed cup."

Specifically stated, the object of my invention is to provide a grease-cup which will meet all of the conditions above indicated, and this I accomplish by the provision of a grease-cup which is capable of being readily converted from one to the other of the above-identified classes—to wit, from a so-called "positive force-feed grease-cup" into a "continuous automatic feed cup," and vice versa.

The invention is illustrated in the accompanying drawings, wherein like characters indicate like parts throughout the several views.

Figure 2:
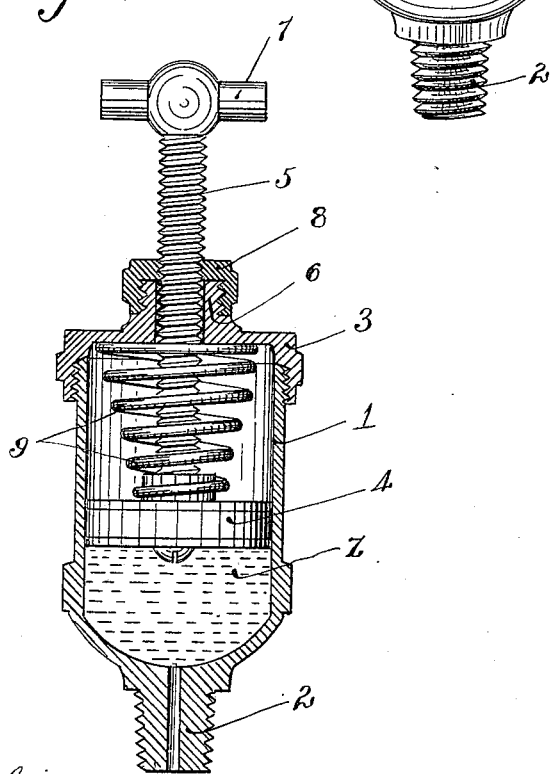
Figure 3:
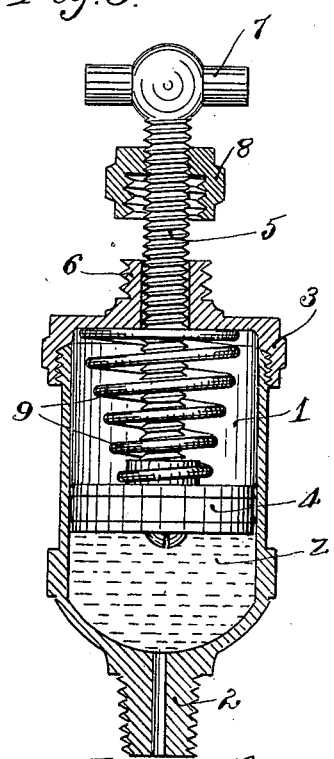

Figure 1 is a perspective view of the improved convertible grease-cup; and Figs. 2 and 3 are views of the cup principally in central vertical section, but with some parts shown in full, the former showing the grease-cup with its parts adjusted for a positive force-feed and the latter with the parts adjusted for a continuous automatic feed.

The numeral 1 indicates the grease-cup, which, as shown, is provided at its bottom with an ordinary perforated discharge-neck 2 and at its upper end with a removable head or cap 3, screwed onto the said cup.

The numeral 4 indicates a piston which is fitted within the cup 1 and is provided with a screw-threaded stem 5, that works loosely and with freedom for longitudinal movements through a threadless passage formed in the hub 6 of the cap or head 3. At its outer end the screw-threaded piston-stem 5 is provided with a handpiece 7, by means of which it may be turned.

The numeral 8 indicates a cap-nut which has screw-threaded engagement with the piston-stem 5 and also with the hub or nipple 6 of the head 3.

The numeral 9 indicates a coiled spring which is placed around the piston-stem 5 and is compressed between the piston 4 and the head 3 of the cup 1. This spring 9 of course when permitted to act yieldingly forces the piston 4 against the grease, (indicated at *z*,) and hence produces the automatic continuous feed.

When the cap-nut 8 is screwed onto the hub 6 of the head 3, the spring 9 is constrained and rendered ineffective. In the position of the parts shown in said Fig. 2 the positive force-feed is, as is obvious, accomplished by turning the stem 5 by means of the handpiece 7.

When the cap-nut 8 is screwed off from the hub 6 of the cup-head 3, as shown in Fig. 3, the positive feed device is rendered inoperative and the spring 9 is released and thrown into action, thereby converting the device into an automatic continuous feed grease-cup.

I consider the convertible grease-cup above described broadly new, and hence it will be understood that many modifications thereof may be made within the scope of my invention.

What I claim, and desire to secure by Letters Patent of the United States, is as follows:

1. The combination with a grease-cup and a piston fitted therein, of a positive force-feed device, an automatic spring-feed device, and means for rendering either of said feed devices active on said piston at will, substantially as described.

2. The combination with a grease-cup, of a piston fitted therein and having a screw-threaded stem, a nut detachably securable to said cup and through which said piston works with threaded engagement, and a spring for action upon said piston, restrained when said nut is secured with respect to said cup, and released, for action, to produce an automatic feed, when said nut is detached, substantially as described.

3. The combination with the grease-cup 1 provided with the discharge-neck 2 and removable head 3 with hub 6, of the piston 4 fitted within said cup and provided with the screw-threaded stem 5 working freely through said hub 6 and terminating in a handpiece 7, the cap-nut 8 having the screw-threaded engagement with said stem 5 and with said hub 6, and the spring 9 compressed between said head 3 and piston 4, substantially as described.

In testimony whereof I affix my signature in presence of two witnesses.

GEORGE KIRKLAND.

Witnesses:
J. E. ANDERSON,
C. PERCY ANDERSON.